Aug. 25, 1970  C. F. BATCHELDER ET AL  3,525,110
METHOD OF MAKING SHOES OVER SHEATHED LASTS
Filed March 7, 1969  9 Sheets-Sheet 2
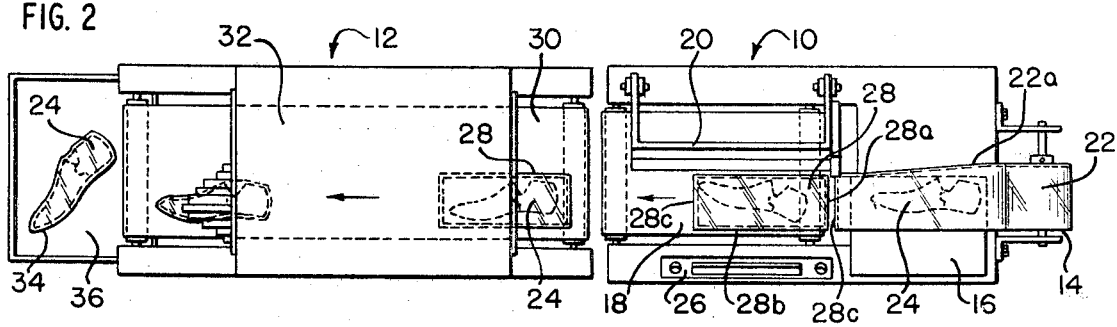
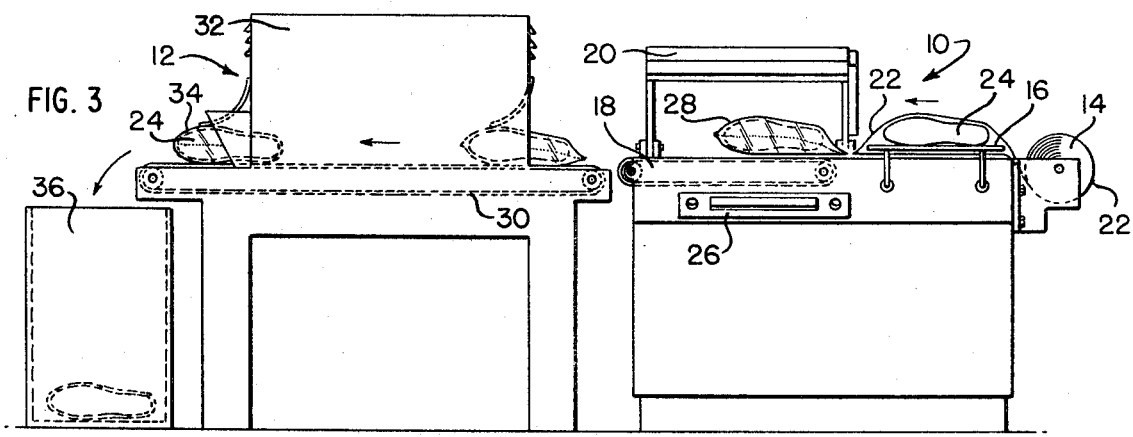
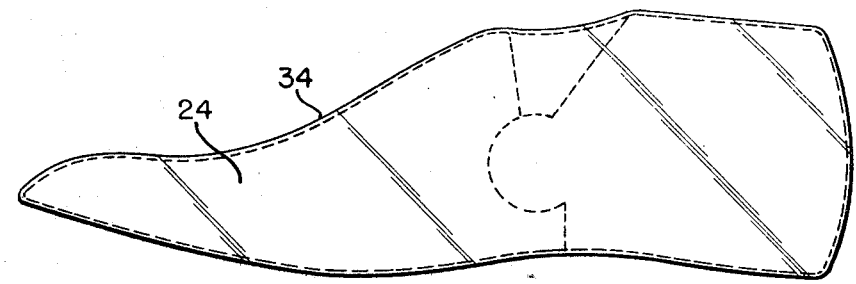
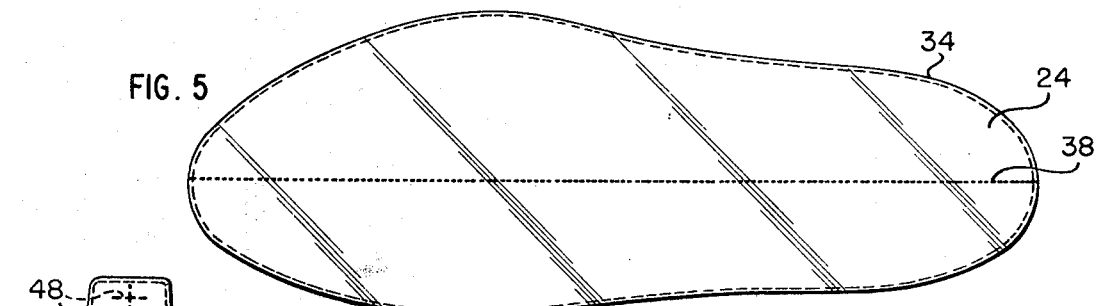
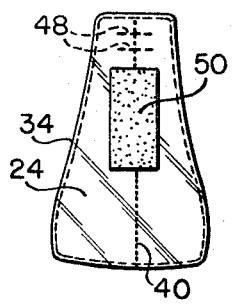
INVENTORS
CHARLES F. BATCHELDER
JEROME A. RUBICO
BY
ATTORNEYS Aug. 25, 1970     C. F. BATCHELDER ET AL     3,525,110
METHOD OF MAKING SHOES OVER SHEATHED LASTS
Filed March 7, 1969     9 Sheets-Sheet 3
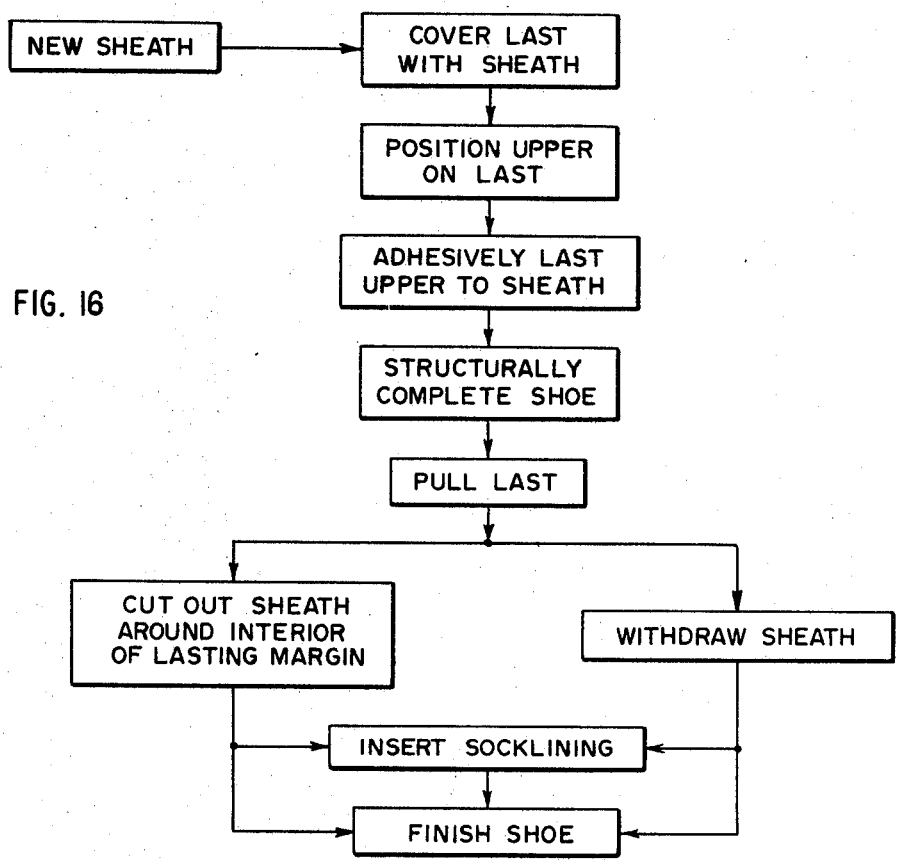
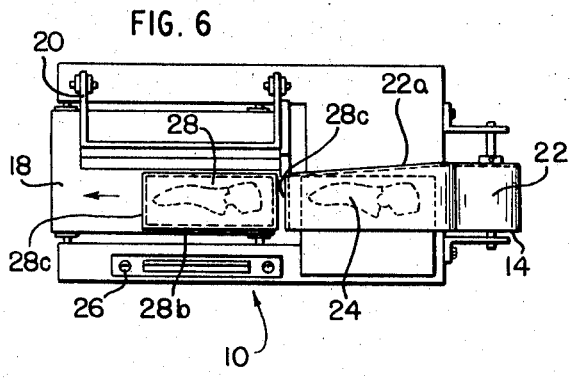
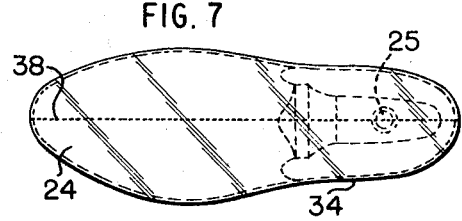
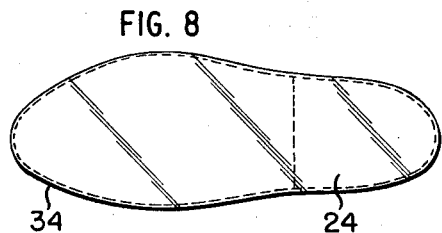
INVENTORS
CHARLES F. BATCHELDER
JEROME A. RUBICO
BY
ATTORNEYS

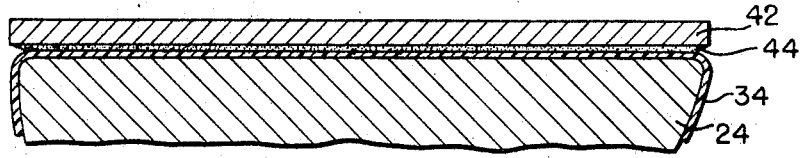
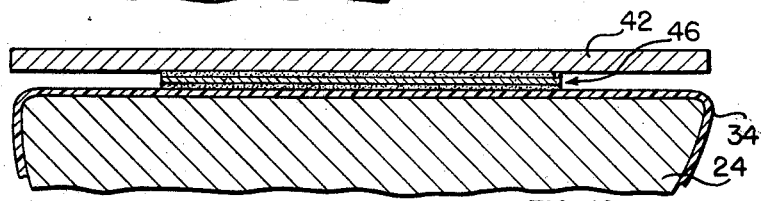
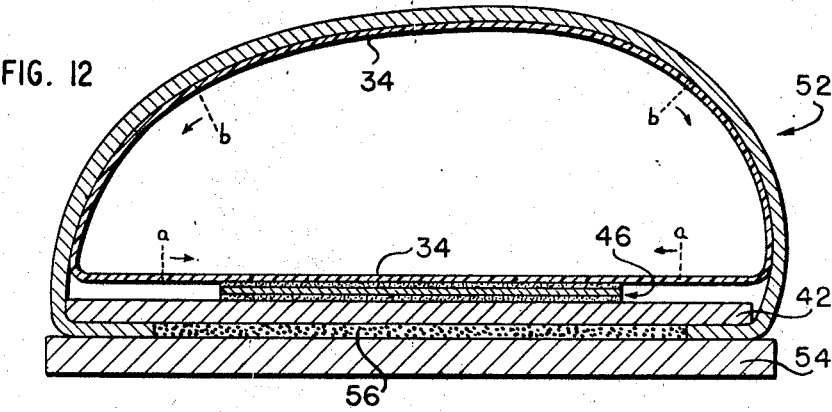
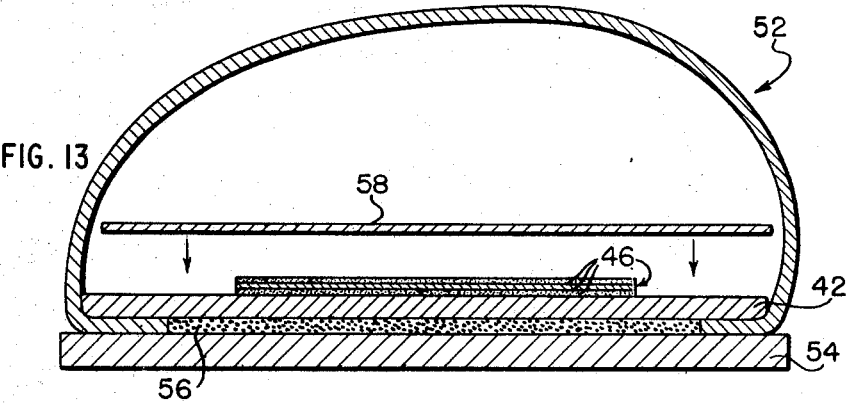
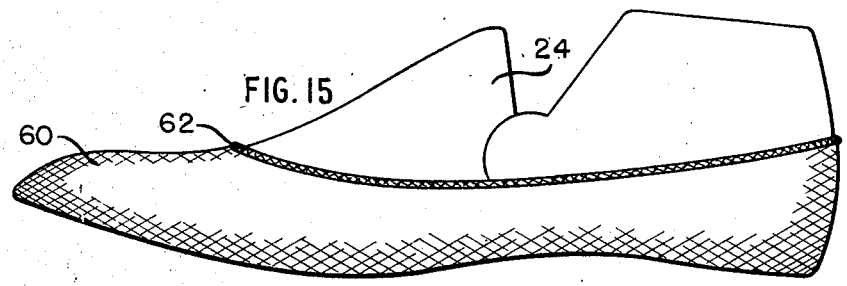
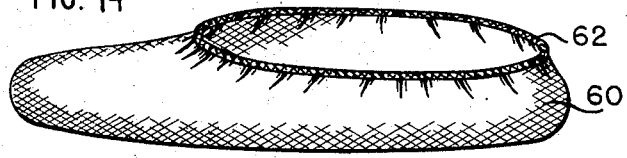

INVENTOR.
CHARLES F. BATCHELDER
BY  JEROME A. RUBICO

Aug. 25, 1970   C. F. BATCHELDER ET AL   3,525,110
METHOD OF MAKING SHOES OVER SHEATHED LASTS
Filed March 7, 1969   9 Sheets-Sheet 8

INVENTOR.
CHARLES F. BATCHELDER
BY   JEROME A. RUBICO

United States Patent Office 3,525,110
Patented Aug. 25, 1970

3,525,110
METHOD OF MAKING SHOES OVER SHEATHED LASTS
Charles F. Batchelder, Milton, and Jerome A. Rubico, Boston, Mass., assignors to Batchelder Rubico, Inc., Boston, Mass., a corporation of Massachusetts
Filed Mar. 7, 1969, Ser. No. 805,205
Int. Cl. A43d 29/00
U.S. Cl. 12—145    16 Claims

ABSTRACT OF THE DISCLOSURE

A method for manufacturing shoes on a sheathed last. In one embodiment, a removable sheath is formed from a thermo-shrinkable, thermoplastic film that is heat shrunk around the last. A conventional insole is temporarily secured to the sheath on the last bottom by means of an adhesive applied to either the sheath or the insole. After positioning the upper on the last, the shoe is lasted and structurally completed. The last is then pulled and the sheath withdrawn from the shoe. The socklining can be inserted in the shoe if desired. Other variations on the basic method of using a sheathed last include: lasting the upper directly to the element or sheath without the use of an insole; leaving the sheath in the finished shoe; and, constructing a "moccasin" on the sheath.

CROSS-REFERENCE TO RELATED APPLICATIONS

The subject matter of the present invention is related to the following co-pending applications of the inventors: Ser. No. 689,884, filed Dec. 12, 1967, for Locked Shoe Construction and Process for Same, and Ser. No. 760,227, filed Sept. 17, 1968, for Beveled Core Shoe Construction and Process for Same.

BACKGROUND OF THE INVENTION

The invention relates to shoe-making in general and, more specifically, to a method of making shoes over sheathed lasts.

The shoe making industry has long been plagued with a variety of problems that are directly attributable to the use of insole tacks for temporarily securing an insole element to a last. Among such problems are the increased last wear caused by repeated tacking in the same general areas of the last, the risk of incomplete or partial removal of the lasting tacks from the shoe, and the requirement for relatively skilled labor at this stage of the shoe making process. Various alternatives have been proposed in the past to overcome the problems associated with insole tacking. Recently, considerable emphasis has been directed to the idea of temporarily securing the insole element to the bare last bottom by means of an adhesive.

A number of proposals have been offered including, spot cementing, double-faced adhesive tape and tape roller wafers. Representative examples of adhesive attachment of insoles to the bare last bottom are found in U.S. Pat. Nos. 3,257,677; 3,257,678; 3,345,663; 3,386,116; 3,089,- 166; 3,052,904; 3,105,895; and in applicants' copending applications Ser. No. 607,053, filed Jan. 3, 1967, for Flanged Roller Wafer and Ser. No. 727,949, filed May 9, 1968, for Stitched Adhesive Tape Releasable Attaching Means.

The use of adhesive means for temporarily securing an insole to the bare last bottom has not gained significant commercial acceptance. A number of factors are probably involved in the industry's hesitancy to adapt this method of securing insoles to last bottoms. For instance, adequate machinery has not been developed to allow the shoe manufacturer to fully realize the potential economies involved in the adhesive insole attaching method. Furthermore, the shoe manufacturers have encountered considerable difficulty in pulling the last from the completed shoe, especially when a double-faced adhesive tape was used to secure the insoles on the last bottom.

It is accordingly a general object of the present invention to provide a new method of shoe making utilizing sheathed lasts.

It is a specific object of the invention to provide a method of shoe making which eliminates the problems associated with conventional insole tacking and the recently proposed method of direct adhesive attachment of an insole element to the bare last bottom.

It is another object of the invention to provide a method of shoe making in which an upper is lasted directly to a sheath on the last bottom.

SUMMARY OF THE INVENTION

The process of the present invention employs a removable, intermediary sheath that is tightly fitted over at least a portion of the bottom of the sides of the last. Preferably, the sheath is formed from a thermoshrinkable, thermoplastic film of the type currently used in the packaging industry for shrink wrapping goods. Conventional bagging and heat shrinking equipment provide a rapid and inexpensive means for producing a conformable sheathing for the last.

After the last has been covered with the removable sheath, an insole element is temporarily adhesively secured to the sheath on the last bottom. The adhesive attachment can be achieved by coating either the sheath or the insole with a suitable cement. Alternatively, a double-faced adhesive tape can be used to attach the insole to the sheath. With the insole correctly placed on and releasably secured to the sheath on the last bottom, the shoe making process then proceeds in a normal fashion. The upper is positioned on the last and lasted to the insole. Thereafter, the shoe is structurally completed and the last pulled. At this point in the shoe making process, normally the sheath is withdrawn from the shoe and a socklining subsequently inserted in the shoe. Depending upon the particular type of sheath employed in practicing the process, the sheath can be re-used on the same or another last.

A number of other shoe constructions are possible from the practice of the present invention. For instance, the uppers and its components can be lasted directly to the bottom and sides of the sheath thereby eliminating the use of an insole in the shoe making process. This particular construction can be termed a "no-insole" shoe. It is also possible, of course, to leave the sheath in the finished shoe. In this case, the sheath can serve as a lining in the finished shoe.

The specific objects, features and advantages of the present invention can best be understood from the following detailed description of a preferred embodiment of the invention, selected for purposes of illustration, and shown in the accompanying drawings.

DESCRIPTION OF THE DRAWINGS

FIG. 2 is a plan view of a bagging, sealing and heat shrinking station showing the bagging, sealing and heat shrinking of a thermo shrinkable sheath around a last;

FIG. 3 is a view in side elevation of the station shown in FIG. 2;

FIG. 4 is a view in side elevation depicting a last covered with a heat shrunk thermoplastic sheath;

FIG. 5 is a view of the bottom of the last shown in FIG. 4;

FIG. 6 is a plan view of a portion of the station illustrated in FIG. 2 showing an alternative placement of the last in the bag of thermoshrinkable film;

FIG. 7 is a view of the top of the sheathed last produced by the last placement shown in FIG. 6;

FIG. 8 is a bottom view of the sheathed last of FIG. 7;

FIG. 9 is a diagrammatic view in cross-section of a portion of the sheathed last and an insole showing the use of an adhesive coating to temporarily secure an insole to the sheath;

FIG. 10 is a similar view to the view shown in FIG. 9, but illustrating instead the use of double-faced adhesive tape to provide adhesive attachment of the insole to the sheath;

FIG. 11 is an end view of the back of a sheathed last illustrating a back height control adhesive tape wafer secured to the heel spine below the height indicators;

FIG. 12 is a diagrammatic view in cross-section depicting the structurally completed shoe after the last has been pulled, but before withdrawal of the sheath;

FIG. 13 is another diagrammatic view in cross-section showing the structurally completed shoe after withdrawal of the sheath and prior to adhesive attachment of a socklining to the double-faced adhesive tape;

FIG. 14 is a perspective view of a stretchable, reusable sheath;

FIG. 15 is a view in side elevation showing the reusable sheath on the last;

FIG. 16 is a flow diagram of the sequential shoemaking operations used in making a shoe in which the upper is lasted directly to the sheath;

Figure 1:
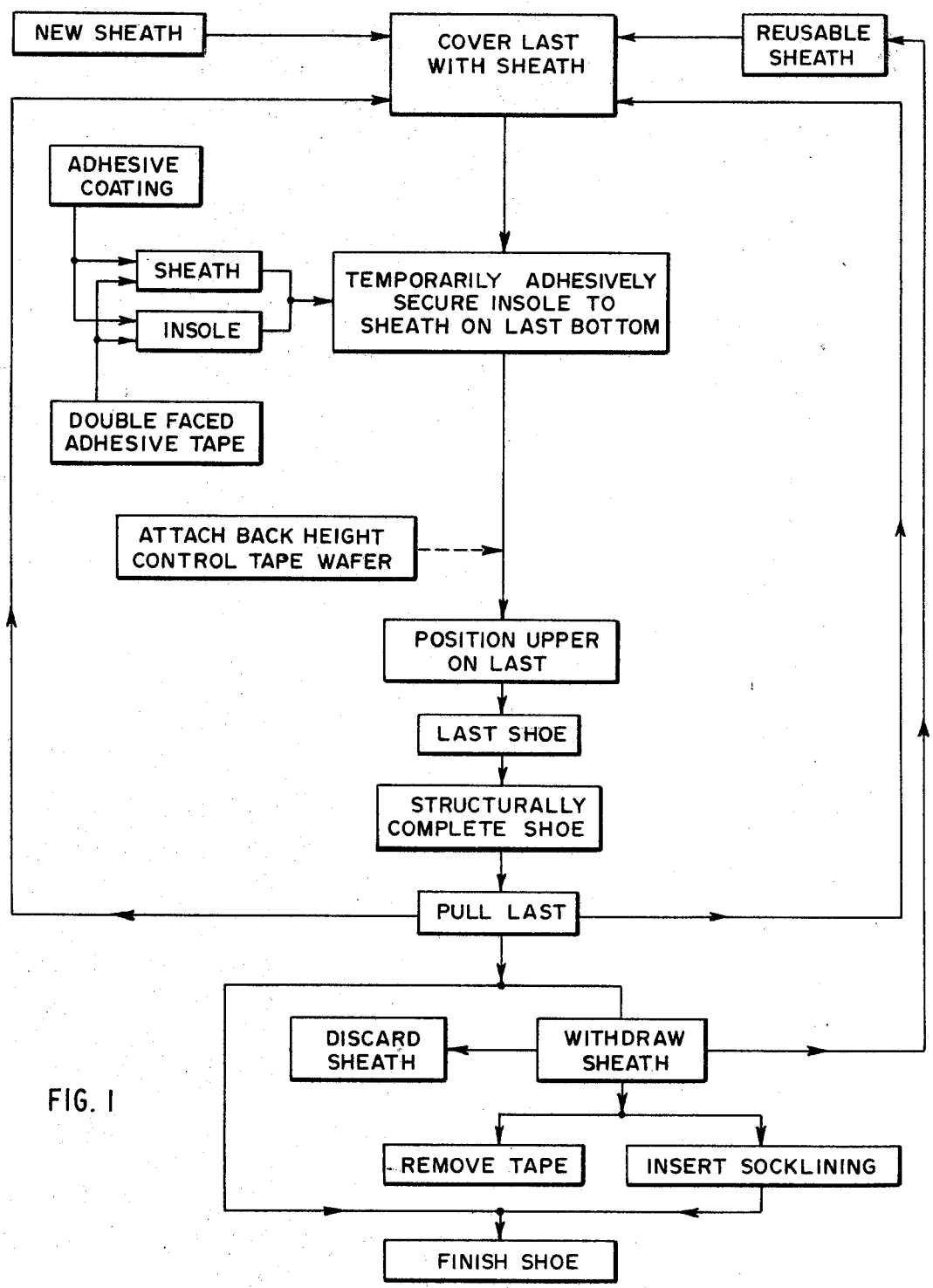
FIG. 1 is a flow diagram of the invention illustrating in block form the sequential steps of the shoe making process.

Turning now to the drawings and particularly to FIG. 1 thereof, there is shown in block form a flow diagram of the method of the present invention for making shoes over sheathed lasts. For ease of description, this method of shoe making will be referred to as the "Baruway" process.

The basic concept of the Baruway process is the partial or full encasement of a shoe last within a removable sheath of thin material that is closely fitted over at least a portion of the last bottom. The sheath is a means by which the structural elements of a shoe can be adhesively assembled in their proper design relationship without any direct adhesive attachment to the last. The term "sheath," as used herein, is generic to both a partial and a full sheath, i.e., one which covers only a portion of the last and one which covers the entire last. The partial or full sheath is mechanically "bonded" or held in position over the last bottom without the use of any attaching means between the sheath and the last bottom. In other words, no adhesive tacks or other attaching means are interposed between the bottom of the last and the last bottom contacting inner surface of the sheath.

With the last covered by either a partial or a full sheath, one or more elements of the shoe are adhesively secured to the sheath. In a sense, the sheath functions as an intermediary between the shoe elements and the last itself. The shoe is then structurally formed around the sheathed last. The sheath can be removed from or left in the finished shoe depending upon the desired type of shoe construction. The particular shoemaking operations employed in manufacturing the shoe will be described below after we discuss the sheath itself and the method for sheathing the last.

Preferably, the sheath is formed from one of the well-known heat shrinkable, thermoplastic films, such as the polyolefin films including polypropylene and polyethylene, vinylidene chloride (saran), or stabilized polyvinyl chloride (PVC) that are currently used in the packaging industry. The use of heat shrinkable films is quite desirable because the resulting heat shrunk sheath tightly conforms to the compound curvatures of the last and provides a dimensionally stable, fixed intermediary element between the last bottom and an overlying insole.

However, it should be understood that the sheath can be fabricated in a number of ways from a variety of suitable materials. For example, conventional vacuum forming techniques including flow on applications can be employed to sheath the bottom and sides of the last. Alternatively, rubber latex and other similar materials can be spray coated on or dip formed around the shoe last. Stretchable molded rubbers and elasticized fabrics can also be used in the construction of a full or partial sheath. Although sheaths formed in this manner can be reused for a number of times, we believe that the maximum manufacturing economies will be realized from the use of a disposable sheath of thermoshrinkable, thermoplastic film that is heat shrunk around the shoe last.

The equipment for sheathing a shoe last with a sheath of thermoshrinkable, thermoplastic film is shown in plan view in FIG. 2 and in side elevation in FIG. 3. The equipment comprises a sealing machine and a heat shrinking machine indicated generally by the reference numerals 10 and 12, respectively. Commercial machines for performing both the sealing and heat shrinking operations are readily available and well known to those in the packaging industry. For example, applicants have experimented with the sealing machine manufactured by the Weldotron Corp. of Newark, N.J., and sold under the nomenclature of "Console-Type Automatic Package Forming Machine, Series 5200" to seal heat shrinkable film around a last. Subsequent heat shrinking of the film was done in Weldotron's Shrink Tunnel Model 7121. Of course, other commercially available units can be used to seal and heat shrink the thermoplastic film around a last.

The sealing and shrinking operations can best be understood by examining FIGS. 2 through 8 in conjunction with the following description. Looking at FIGS. 2 and 3, the sealing machine 10 comprises a supply roll 14, a work or "bagging" surface 16, a conveyor 18 and a pivotally mounted sealing head 20 containing one or more selectively energizable sources of thermal energy (not shown). The internal components of the sealing machine 10, such as, the pneumatic or hydraulic systems, electrical equipment, drive motors and so forth, have not been shown in the drawings for purposes of clarity.

The supply roll 14 has a heat shrinkable film 22 wound thereon in sleeve form with a fold line 22a facing away from the operator as viewed in FIG. 2. A number of readily available heat shrinkable materials can be used to form the sheath. For example, we have used heat shrinkable PVC film sold by the Reynolds Metals Co. under the trademark "Reynolon" and 1.5 mil PVC film sold by the Borden Chemical Co. of North Andover, Mass. The thickness of the film before shrinking is not critical. However, for purposes of maximum economy and ease of operation, we prefer a film thickness of approximately .75 mil before shrinking.

Referring to the plan view of FIG. 2, the normal operator position is located directly in front of the sealing machine 10. When wrapping a conventional bare last 24, the operator places the last in the center folded heat shrinkable film 22 and then moves both the last and film together to a position directly beneath the pivotally mounted sealing head 20 as indicated by the arrow in FIG. 2. The operator then initiates the sealing cycle by actuating the appropriate machine controls 26. Upon actuation of the controls 26, the sealing head 20 is automatically lowered to the horizontal or sealing position by pneumatic or hydraulic means. When the sealing head is in the sealing position, the source or sources of thermal energy are energized to form a bag 28 by sealing the upstream edge 28a and facing side 28b of the center folded heat shrinkable film 22. The sealing operation also severs the upstream of the bag from the leading edge 28c of the next "bag." Thus, after the first sealing cycle, the leading edge 28c, of each bag is sealed by the preceding sealing operation.

After sealing, the bagged last is moved by conveyor 18 onto conveyor 30 which carries the bagged last through a heat tunnel 32 that generates sufficient heat to cause the heat shrinkable film bag 28 to shrink tightly around the last thereby forming a sheath 34. Upon emerging from the heat tunnel, the sheathed last 24 is deposited in a collecting tub 36 located at the downstream end of conveyor 32.

The last and the tightly fitting sheath of thermoshrunk, thermoplastic film are shown in greater detail in the side elevation and bottom views of FIGS. 4 and 5. From an inspection of FIGS. 2 through 5, it can be seen that the sealed bag side 28b, after heat shrinking, forms a seam 38 that extends substantially along the longitudinal axis of the last bottom. This particular location of the sheath seam 38 is produced by placing the bare last 24 within bag 28 as shown in FIGS. 2 and 3. The last generally should be positioned with the heel portion of the last reasonably close to the corner of the sealing head 20 so that the last is located approximately along the diagonal of bag 28. It is also desirable to keep the bag sizes as small as possible in order to insure a good, tight, shrink of the film around the bare last.

Alternatively, the seam 38 can be positioned on the upper surface of the last leaving a smooth, unseamed area of thermoshrunk film on the last bottom. This sealing arrangement is obtained by positioning the last 24 within the bag of thermoshrinkable film with the last bottom facing the center fold 22a of the film, as illustrated in FIG. 6. Looking at FIGS. 7 and 8, the resulting heat shrunk sheath 34 has seam 38 positioned along the top of the last (FIG. 7) while the entire bottom of the last is covered with a seamless, uniform layer of tightly fitting thermoshrunk, thermoplastic film (FIG. 8). In the alternative bagging or sealing arrangement, seam 38 is normally formed from a portion of the sealed forward edge 28c of bag 28 as well as from the facing bag side 28b. The rear or trailing bag edge 28a also forms a corresponding sheath seam 40 which is shown in the end view of the sheathed last back depicted in FIG. 11.

It should be noted that the seam placement on the sheathed last is not a critical parameter of the Baruway process and that the process can be practiced with the seam in a number of locations including those shown in FIGS. 4, 5, 7, 8 and 11. However, we believe that it is preferable to position the seam on the upper surface on the last in order to provide a uniform, unseamed, sheath surface on the bottom of the last. This arrangement will produce a tighter lasting of the shoe upper to the insole. Furthermore, if there is any offset marking of the shoe components by the irregular ridge or bump of seam 38, the marking will appear on the relatively unseen, inside surface of the upper lining rather than on the highly visible exposed surface of the insole in the finished shoe.

It will be appreciated that since the actual placement of the bag seam 38 is not a limiting factor in the Baruway process, the operation of sheathing the last 24 is subject to considerable automation. For instance, the use of pre-sized, preformed bags in automatic bagging machines coupled with the use of automatic sealing and shrinking machines will significantly reduce the amount of hand labor required to cover the last with a sheath.

The sheathing of the shoe last is the first step in the practice of the Baruway process. Referring back to the flow diagram of FIG. 1 and to the cross-sectional views of FIGS. 9 and 10, the next step in the process is the use of the sheath as an intermediary to which elements of the shoe can be adhesively attached, in lieu of adhesive attachment directly to a barelast as taught by the previously mentioned prior art. The sheathed last can be spindled by punching a hole in the shrunk film over the last spindle hole 25 (FIG. 7) and mounting the last on a conventional spindle (not shown). Alternatively, the hole in the sheath can be formed by cutting the bag 28 over the spindle hole before shrinking the thermoshrinkable film in heat tunnel 32. With the last bottom covered by the tightly fitting sheath 34, an insole element 42 is temporarily secured to the sheath by adhesive means, as shown in FIGS. 9 and 10, instead of by the traditional method of nailing.

Various adhesive means can be employed in the Baruway process to temporarily adhesively secure the insole 42 to the intermediary sheath 34. For the large volume of cement-process shoes which normally have a socklining over their insoles, we prefer to use an adhesive layer 44 between the insole 42 and sheath 34, as shown in FIG. 9. A number of adhesives can be employed, although we prefer a latex cement having a strong bonding power and a long "tack" life. A cement of this type can be applied either to the sheath over the bottom of the last or to the upper face of the insole as shown in the flow diagram of FIG. 1. From the standpoint of economy, the latter procedure seems most preferable. If the upper face of an insole is given an overall coating of cement by passing the insole through a standard roller cementer, ample cement will be retained on the insole to hold the insole to the sheath which covers the last bottom. Moreover, even after last pulling and removal of the sheath, there will still be sufficient cement in a tacky condition to hold a subsequently inserted socklining.

For shoes such as Goodyear welts which commonly have no socklining in the finished shoe, we recommend that a double-faced adhesive tape 46 be used as illustrated in FIG. 10. The double-faced adhesive 46 can be applied to either the sheath itself or to the insole. After withdrawal of the last and subsequent removal of the sheath, the tape can be used to hold a socklining in place. Alternatively, the tape can be removed from the finished shoe.

It should be noted that regardless of the particular means of adhesive insole attachment, none of the adhesive actually contacts the last bottom because the adherance of the insole is to the sheath and not to the last itself. The sheath functions as a removable intermediary to hold the insole in proper juxtaposition against the last bottom for subsequent lasting of the upper components to the insole.

FIG. 11 illustrates one of the advantages of using a transparent or translucent, thermoshrinkable film to form the sheath for the last. Looking at FIG. 11, it can be seen that the back height control marks 48 on the heel spine of the last are visible to the operator even though the last is covered with the sheath 34. The Baruway process with its sheathed last, provides a simple and relatively inexpensive means for controlling the back height of uppers. The proper control of the back height of shoe uppers is an important feature of good shoe making, but one which is often abused. This fault or weakness in the current shoe making practice is largely attributable to the nature of the assembly machine. Even if the assembler is skillful and careful in positioning the back of the upper correctly on the last, the design of the machine prevents him from actually seeing the back of the upper at the time when its position is fixed by nailing to the last or to the insole or both. During the interval from the time when the assembler places the upper on the last and the time when the machine fixes its position, the upper may slip up, down or sideways.

The preferred means for controlling back heights on sheathed lasts of the Baruway process requires a very minor increase in cost, but it enables the shoe manufacturer to eliminate the "assembling operation" as it is currently done. Most lasts are now fitted with one or more marks on the back of their heel spines to indicate the desired top heights of the uppers to be lasted thereon. These marks can be readily seen through the preferred transparent or translucent thermoplastic film used for the last sheath. The means for control is simply a small wafer of double-faced adhesive tape 50 about half an inch wide and an inch high applied to the sheath of the last over the bulge of its heel spine below the selected indicator 48, as illustrated in FIG. 11. With the back height control wafer in place, the operator can position the back of the upper to its proper height and alignment, press it into contact with the adhesive tape wafer 50 and be confident that it will not slip out of place during his subsequent manipulations of the last, the upper and the shoe making equipment.

The use of the double-faced tape wafer 50 to control back height is a desirable but not a required operation for the Baruway process. Therefore, the step of attaching the tape wafer to the last has been indicated as an optical step by the dashed line in the flow diagram of FIG. 1. It will be understood by those in the shoe making industry that the conventional "assembling" operation can be employed in the practice of the Baruway process without imparing the process itself, albeit at a sacrifice in the potential accuracy of the back height control.

The visibility of the back height control markings 48 can also be utilized in the area of "backpart molding." Many shoe manufacturers presently mold the back portion of the shoe upper, including the counter which is inserted in the pocket before molding. The molding operation is performed before the upper is assembled over the last. The operation shapes and heat-sets the back into approximately the desired curvatures in the finished shoe.

Backpart molding is presently done on special equipment which shapes the upper with pressure and heat over a specially shaped metal form. Theoretically, each shoe manufacturer has a series of forms of varying sizes and shapes that correspond to the backs of the manufacturer's lasts. However, in practice, few factories have molds which duplicate all of the factories' last styles and sizes. The potential advantages of backpart molding are further impaired by the nature of the molding operation. The backpart molding machine operator is supposed to pick the proper molds, changing them in the machine to correspond to the upper on which he is working. Since the molds are hot and the changing operation is tedious, mold changes are often overlooked.

The control of back heights is rather difficult in backpart molding because the height marks cannnot readily be seen after the upper has been placed in the molding machine. Furthermore, since most of the molding machines also mold a heel seat, if the height is wrong, it practically cannot be corrected. The resulting shoes, therefore, often do not conform properly to the compound curvatures of the last.

By using the sheathed lasts of the Baruway process, the shoe operator can accurately position the backs of the uppers on the last and secure the upper to the last with adhesive tape wafer 50. The accuracy of positioning can be easily checked before the uppers are formed into their final shape by the molding machine because the height control marks 48 are visible through the last sheath 34. In addition, it should be noted that the backs can be molded on their actual lasts thus providing a shoe which conforms more closely to the actual shape of the last. It will be appreciated that by using the sheathed lasts of the Baruway process, the shoe manufacturer can save the cost of a special molding machine and the specially shaped metal forms in addition to eliminating another operation in the shoe making process with a concomitant reduction in the cost of the goods manufactured.

Once the upper has been accurately positioned on the last, the shoe is lasted and structurally completed in a conventional manner. The structurally completed shoe is now ready for last pulling. The sheath is cut or broken around the throat of the shoe to permit the last to be pulled from the shoe.

One of the important features of the Baruway process is the ease of pulling the last from the shoes. Current shoe making practice generally calls for painting the top of the foreparts of the lasts with "last slip" and for inserting a waxed paper "heel paper" between the back end of the last and the interior surfacce of the counter portion of the shoe upper. The "last slip" and "heel paper" are used as aids to lessen the frictional resistance to last pulling. However, repeated applications of the "last slip" tend to build up an accumulation of noticeable thickness which alters the size of the last and the shoes built on such oversized last. In the Baruway process, the preferred thermoshrinkable, thermoplastic sheath film is both smooth and relatively slippery and its use eliminates the need for applying "last slip" and the use of "heel paper." Another advantage of sheathing the last in plastic film is the avoidance of the risk of having any paste, adhesive or any stiffening chemical used in conjunction with the box toes or counters of present day shoes bleeding through the lining fabrics of the shoes into contact with the last and adhering thereto, thereby making last pulling extremely difficult in such cases.

Turning now to FIG. 12, there is shown in diagrammatic cross section a structurally completed shoe, indicated generally by the reference numeral 52, after the last has been withdrawn, but prior to the withdrawal of the sheath 34. The vertical scale in FIG. 12 has been deliberately exaggerated to better show the various components, especially the relatively thin double-faced adhesive tape 46 and sheath 34. It will be appreciated that in actual practice the thickness of the sheath and tape are relatively insignificant when compared to the thickness of the wear sole 54 and filler 56. Preferably, the sheath 34 is withdrawn from the inside of the structurally completed shoe. If the shoe is not to carry a socklining, the double-faced tapes 46 and 50 that are used to hold the insole and the back of the uppers to the last sheath 34 are also pulled out of the shoe. If a socklining is to be put in the shoe, only the back height control wafer 50 need come out. FIG. 13 illustrates diagrammatically in cross section with similarly exaggerated vertical scale the placement of a socklining 58 in the shoe. It will be appreciated that the double-faced adhesive tape serves a dual function in that, first, it temporarily secures the insole 42 to the sheath which covers the last bottom, and secondly, it permanently holds the socklining in place with respect to the insole. After insertion of the socklining the shoe is finished in a conventional manner.

The preceding description of the Baruway process has been directed to the use of the preferred disposable sheath formed from a thermoshrinkable, thermoplastic film. However, a Baruway process is not limited to the use of such a disposable thermoplastic sheath. For instance, it has already been mentioned that a re-usable sheath can be formed from a variety of materials including stretch fabrics, molded rubber, synthetics and the like.

Looking now at FIGS. 14 and 15, there is shown a partial, re-usable sheath 60 formed from a stretchable fabric. Preferably the sheath 60 has a selvage 62 extending around the throat of the sheath. When the re-usable sheath 60 is stretched and fitted over the last 24, as shown in FIG. 15, the sheath covers the bottom, the toes and the bulge of the heel of the last. In this position, the sheath is tightly held against the last by the tension of the stretched fabric. Referring back to the flow diagram of FIG. 1, the practice of the Baruway process with a re-usable sheath is illustrated in the right hand side of the diagram by the line running from the "Withdraw Sheath" block to the block labelled "Reusable Sheath." If the re-usable sheaths are formed from a stretchable fabric, the sheaths can be washed or otherwise cleaned before re-use on the last. Although the use of stretchable fabric or molded re-usable sheaths is feasible in practicing the Baruway process, we believe that from the standpoint of maximizing the manufacturing economies of the process, the sheath should be formed from a thermoshrinkable, thermoplastic film.

Figure 17:
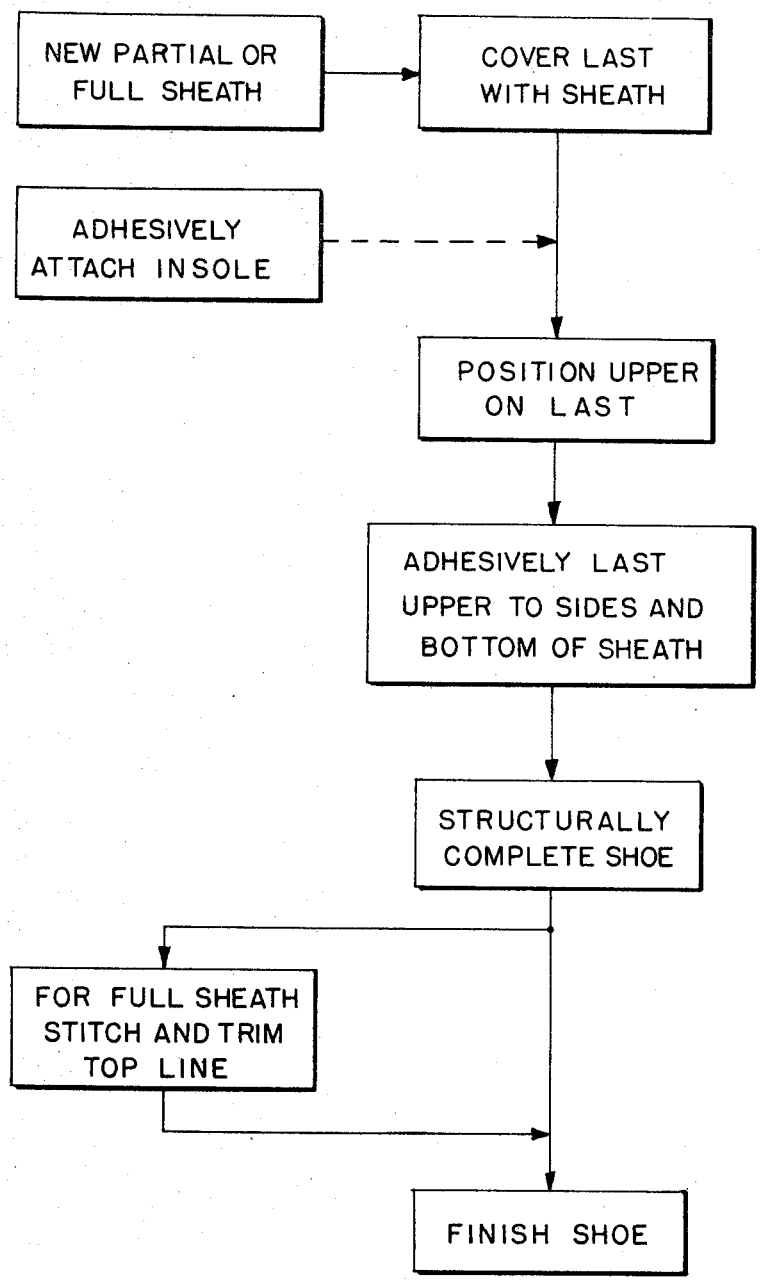
FIG. 17 is a flow diagram of the sequential shoemaking operations used in making a shoe in which the upper is lasted directly to the bottom and sides of the sheath which forms a part of the finished shoe.
Figure 18:
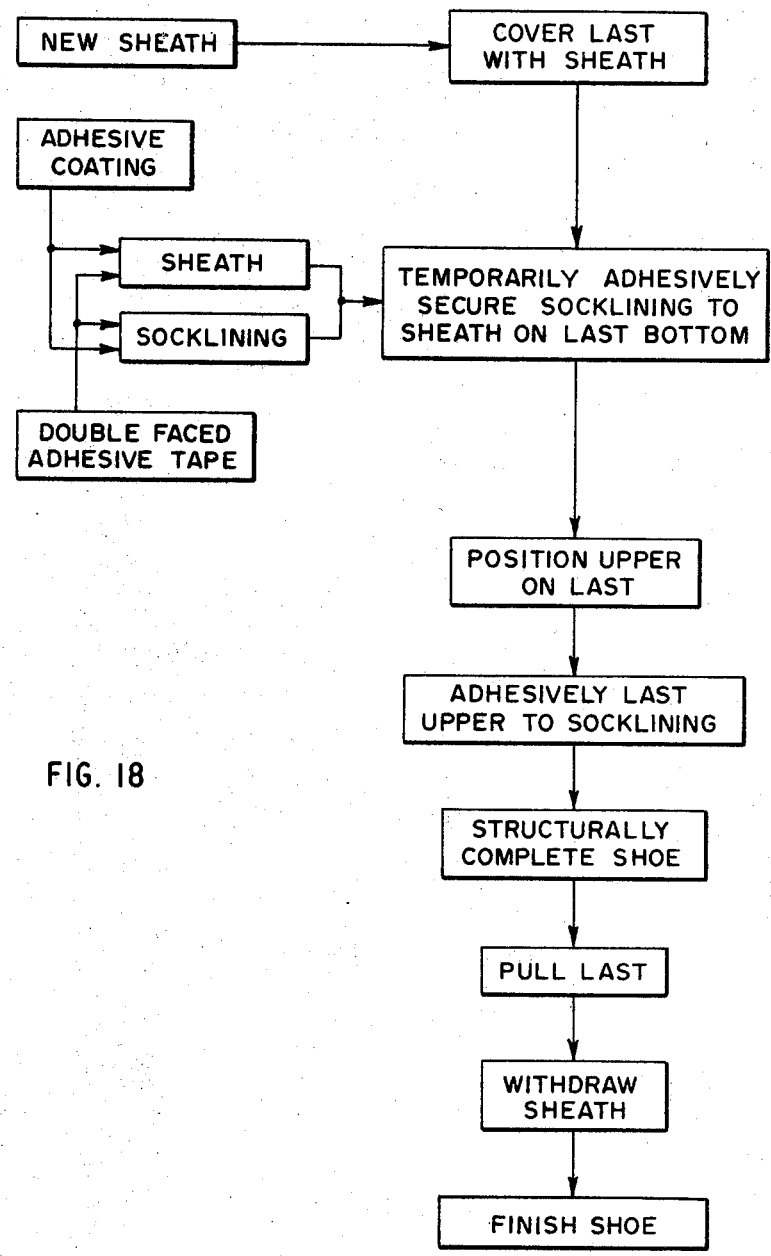
FIG. 18 is a flow diagram of the sequential shoemaking operations used in making a shoe in which the upper is lasted to a socklining that is adhesively secured to the sheath.

The sheathed last of the Baruway process can be used to produce a number of other shoe constructions, three of which are illustrated, by way of example, in FIGS. 16, 17 and 18. FIG. 16 shows in flow diagram the construction of a shoe in which the upper is adhesively lasted directly to the sheath. For many years shoemakers have dreamed of making a commercially acceptable shoe which has a socklining but no insole. Such a shoe would offer the near ultimate in lightness and flexibility and would be ideal for athletic shoes for football, baseball, track, bowling, jockey boots and the like. The so-called "no-insole" shoe can be constructed using the Baruway process.

Referring to FIG. 16, a new sheath, preferably formed from a thermoshrinkable, thermoplastic film is used to cover a conventional last. The upper and its elements are positioned on the last and then adhesively lasted directly to the sheath over the bottom of the last. The shoe is thereafter structurally completed in a conventional manner. After last pulling, two alternatives are available wtih regard to the treatment of the sheath. The sheath can either be wtihdrawn from the shoe or cut out around the interior of the lasting margin within the area that normally would be covered by a socklining. The latter operation leaves a portion of the sheath in the finished shoe as illustrated by the sheath positioned beneath lines a—a in the direction of the arrows as shown in FIG. 12. At this piont, the shoe manufacturer has the option, as shown diagrammatically in FIG. 16, of inserting a socklining and then finishing the shoe or finishing the shoe without inserting a socklining.

It is also possible in the Baruway process to leave the sheath in the finished shoe. Referring to FIG. 17, a new sheath is used to cover the last. Preferably, the sheath is a partial sheath, such as the one illustrated in FIGS. 14 and 15. However, a full sheath can be employed if it is subsequently cut and trimmed. With the last sheathed, the upper and its components are adhesively lasted to both the bottom and sides of the sheath. A number of conventional lasting adhesives can be employed in this step. However, we believe that a one-way cement which is spray coated on the upper will be most desirable from the stand-point of ease of application.

After lasting, the shoe is structurally completed and the last is pulled. If a full sheath was used to cover the last, the sheath is cut around the throat of the shoe, stitched and then trimmed to the top line of the shoe. Thereafter, the shoe is finished in a normal manner. It will be appreciated that the sheath remains in and forms the lining of the finished shoe. In other words, the upper and its components have been lasted to the lining of the finished shoe. The sheath remaining in the finished shoe is shown in FIG. 12 by the portion of the sheath 34 positioned between lines b—b in the direction of the arrows.

If desired, an insole can be adhesively secured to the sheath before lasting the upper. This optional step is illustrated in FIG. 17 by the dashed line from the box labeled "insole." If the optional insole is used, then the process steps are essentially the same as shown in FIG. 1 with the sheath left in the finished shoe.

The Baruway process can also be used to last an upper directly to a socklining that is temporarily adhesively secured to the sheath on the last bottom. The steps in this process are illustrated in flow diagram in FIG. 18 of the drawings. In this construction, a new sheath is used to cover the last and the socklining is then adhesively secured to the sheath either by an adhesive coating or by the double-faced adhesive tape described above in connection with FIG. 1. Once the upper has been correctly positioned on the last, it is adhesively lasted to the socklining. Thereafter, the shoe is structurally completed and the last pulled. The sheath can then be withdrawn and the shoe finished in a conventional manner.

Figure 19:
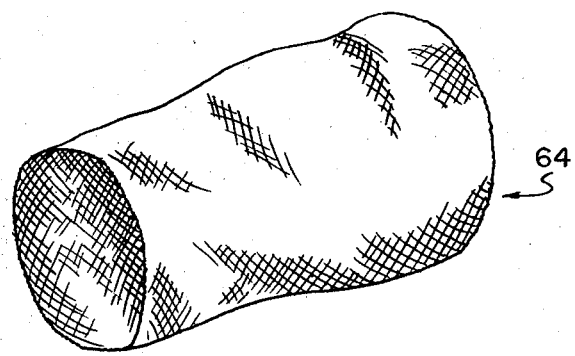
FIG. 19 is a perspective view of another embodiment of a stretchable re-usable partial sheath in the form of a tubular strip.
Figure 20:
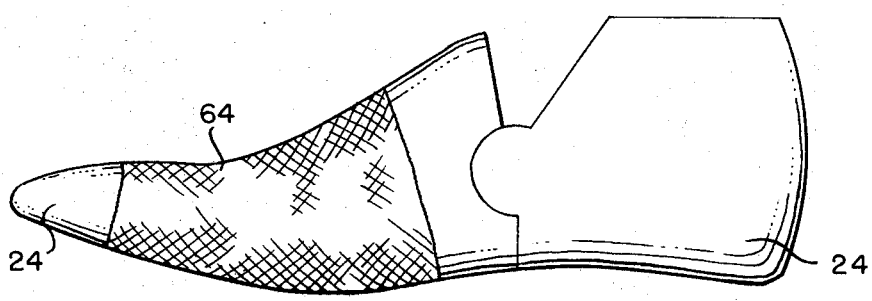
FIG. 20 is a view in side elevation showing a last covered with the strip sheath illustrated in FIG. 19.

It has already been mentioned that the sheath 34 can cover either the entire last or a portion thereof. The full sheath has been discussed before in connection with FIGS. 4 and 5 while one example of a partial sheath has been described and illustrated in FIGS. 14 and 15. The partial sheath can be formed in a variety of ways; representative examples of which are depicted in FIGS. 19 through 24. FIG. 19 illustrated a tubular partial sheath 64 formed from a stretchable fabric material. When sheath 64 is fitted over the last 24, it covers most of the forepart and a portion of the shank area of the last bottom as illustrated in FIG. 20. The tubular, stretchable partial sheath 64 is particularly useful in connection with the reusable sheath method of the Baruway process discussed above.

Figure 21:
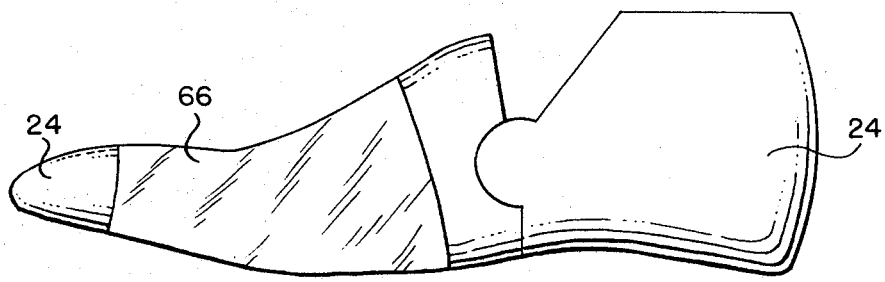
FIG. 21 is a view in side elevation showing a last covered with a partial sheath in the form of a strip of thermoshrunk thermoplastic material.
Figure 22:
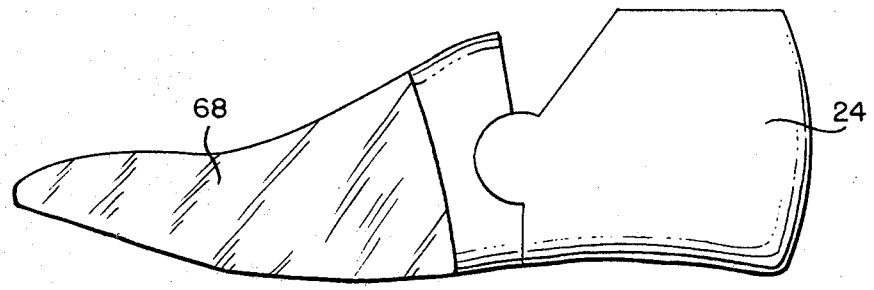
FIG. 22 is a view in side elevation showing another embodiment of the partial sheath formed from a thermoshrunk thermoplastic material.

The preferred thermoshrinkable, thermoplastic material can also be employed to form a partial sheath. FIGS. 21 and 22 illustrate two configurations of a heat shrunk, thermoplastic sheath 66 and 68 respectively. In the case of sheath 66, the toe portion of the last 24 remains exposed, while sheath 68 encases its toe portion as well as the forepart and some of the shank area of the last.

Figure 23:
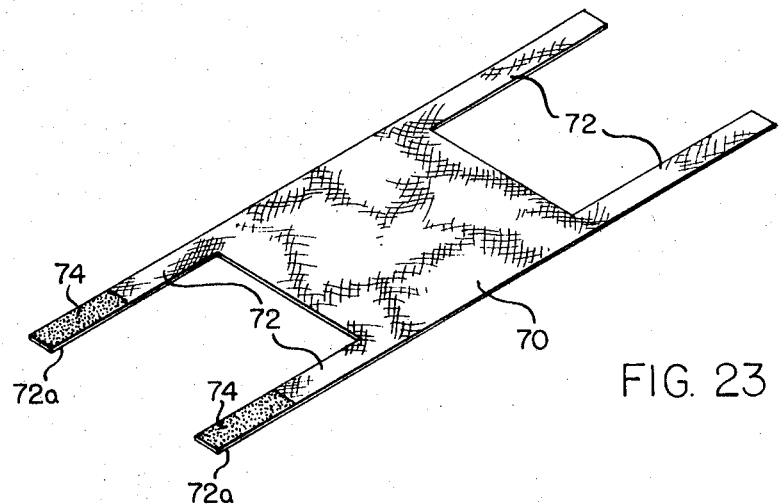
FIG. 23 is a perspective view of another embodiment of the sheath having pressure sensitive, adhesive coated tabs.
Figure 24:
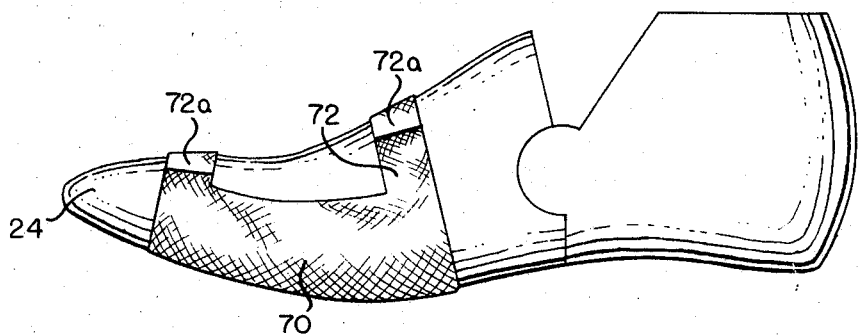
FIG. 24 is a view in side elevation showing a last covered with the sheath illustrated in FIG. 23; and, FIG. 25 is a flow diagram of the sequential shoe making operations employed in the construction of a moccasin shoe according to the process of the present invention.
Figure 25:
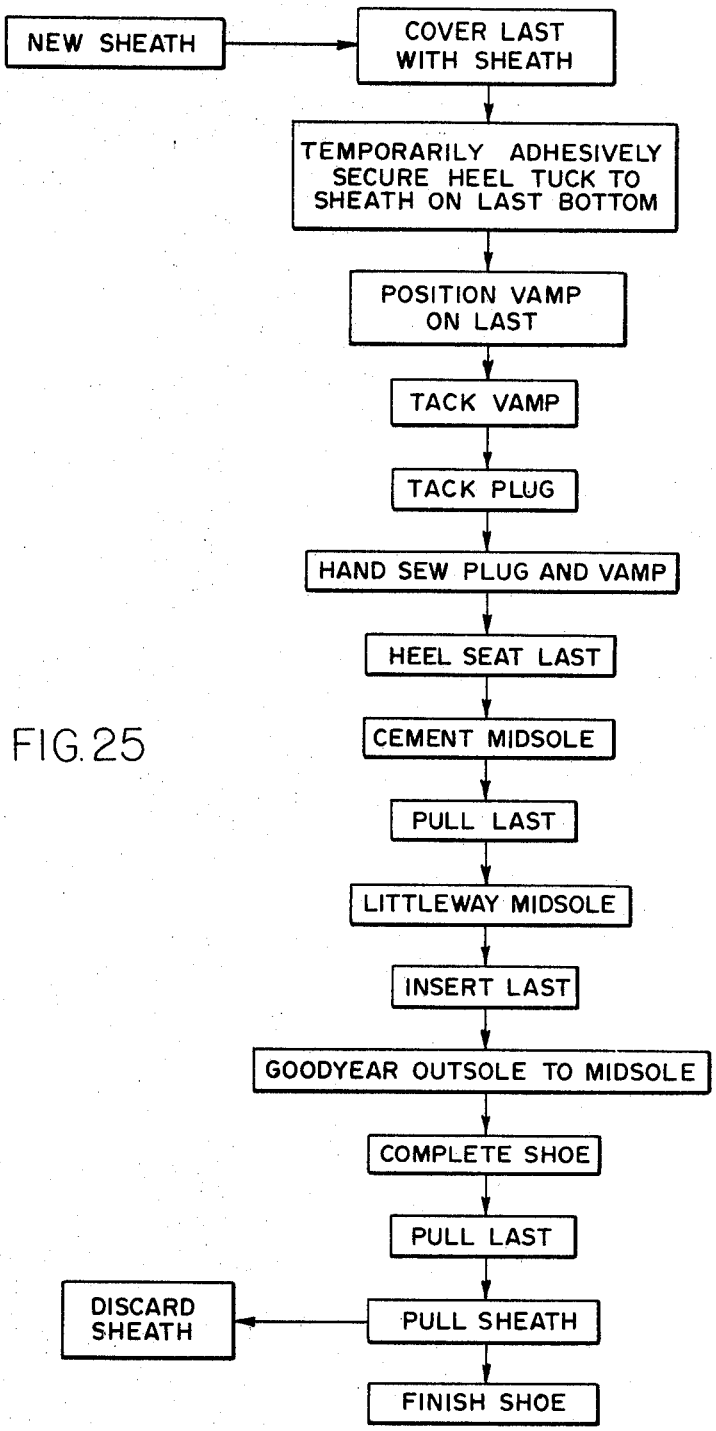

Another variation of the partial sheath is shown in FIG. 23 by itself and positioned on the last in FIG. 24. Sheath 70 has a generally H shaped configuration with four tab extensions 72. Two of the extensions have the outer ends 72a thereof coated with a pressure sensitive adhesive 74 so that when the sheath is positioned on the last 24, as shown in FIG. 24, the tab extensions 72 can be folded over each other with the adhesive coated tab extensions 72a on top thereby locking the sheath against the last. It should be noted that the adhesive contact is between one tab and the other and not to the last itself.

It will be appreciated that in all of the sheaths described above, including the full sheath and each of the partial sheaths, the sheath is mechanically "bonded" i.e., held against the bottom of the last without the use of any attaching means, such as, tacks or adhesives between the last bottom and the last bottom contacting portion of the sheath. This arrangement facilitates the subsequent pulling of the last and obviates the problems encountered with the prior art adhesive attachments of the insole directly to the last.

The Baruway process can be employed to manufacture a variety of types of shoes including moccasins. Before discussing the steps in manufacturing a moccasin according to the Baruway process, it will be helpful to briefly review the areas in which the manufacture of the so-called "true" moccasins differ from other shoe making processes. The manufacturing techniques employed in producing moccasins can be characterized in the following ways :

(1) The vamps are commonly lasted wet.

(2) The moccasin lasts are generally fitted with metal toe and heel plates which, after repeated use with wet vamps, rust and add to the difficulties of last pulling.

(3) Most moccasins embody fibre heel tucks but no insoles.

(4) The heel tucks are temporarily attached to the last bottom by staples or tacks which are partially hidden by the overlasted margins of the vamp bottom. Occasionly, some of these fastenings are overlooked and not removed before sole laying.

(5) When the moccasins are nearly finished and while still on the lasts, many of the uppers are "antiqued" with a stain. The stain often gets on the exposed parts of the lasts and repeated antiquing obliterates the size marking on the top of the back parts of the last. The loss of the size marks creates confusion when the last are being "picked" for subsequent use, and when the sole layer has to know the size of the shoes to pick the correct soles therefor.

(6) The last must be pulled for Littleway stitching and normally reinserted in the shoe after that operation.

A number of problems which are directly attributable to the particular characteristics of the moccasin type shoe construction can be eliminated by the use of the Baruway process. The sequential shoe making operations employed in the construction of a moccasin shoe according to the present invention are shown in flow diagram form in FIG. 19. The first step in the construction of a Baruway process moccasin is to cover the last with a new sheath, preferably, a sheath formed from thermoshrinkable, thermoplastic film as described above. With the last bottom covered by the sheath, the heel tuck is adhesively secured to the sheath by adhesive means, such as, the previously described adhesive layer or double-faced adhesive tape. In this instance, the sheath functions as an intermediary to maintain a heel tuck, instead of an insole, in position on the last bottom during subsequent shoe making operations. The next few steps in the construction of a moccasin shoe are standard operations: the vamp is positioned on and tacked to the last; a moccasin plug is tacked to the last and then the plug and vamp are hand sewn; after hand sewing, the heel seat is lasted; and finally, the midsole is cemented to the lasted shoe.

At this point, the last must be pulled for Littleway stitching of the midsole. In order to pull the last, the thermoshrunk, thermoplastic sheath can be cut around the throat of the shoe. Since the thermoplastic film is relatively smooth and slippery the last can easily be pulled from the shoe leaving the sheath inside. If desired, the sheath can be withdrawn at this time. With the last removed from the shoe, the midsole is Littleway stitched in a conventional manner. The last is normally then replaced in the shoe and an outsole is Goodyear stitched to the midsole. Thereafter, the shoe is completed in a conventional manner and the last is again pulled from the shoe. The sheath is then pulled from the shoe and discarded. If double-faced adhesive tapes were used to temporarily adhesively secure the heel tuck to the sheath on the last bottom, the tape or tapes are also pulled at this time. The final finishing of the shoe then completes the shoe making operation.

It will be appreciated that the adhesive attachment of the heel tuck to the sheath eliminates all of the problems associated with mechanical attachment by nailing or stapling the heel tuck directly to the last itself. Furthermore, if the preferred thermoshrinkable, thermoplastic film is employed to form the sheath, no adhesive can accidentally touch or adhere to the last. Having described in detail a number of preferred embodiments of the Baruway process, it will be appreciated by those skilled in the art that the use of the sheathed last in the shoe making operation affords a number of economies to the shoe manufacturer. The use of the sheathed last allows the shoe manufacturer to combine at "pulling over" all the operations now normally done at "insole tacking," "assembling" and "pulling over," with a savings estimated at least twenty-five percent of the present combined labor costs for these three operations. In addition, the adhesive methods of attaching the insole or other lasting elements to the sheathed last eliminates the need of using an insole-tacking machine and the subsequent tack knocker in the shoe factory. Similarly, the adhesive method of controlling the heights and alinement of the backs of the uppers does away with the need of using an assembling machine. Additional savings are realized because of the ease of last pulling, the last being pulled out of its sheath with a minimum of friction. This allows the manufacturer to eliminate the use of last slip and heel papers. Thus, the cost for labor and materials for these two operations are saved. Further savings can also be realized both in labor and material from the practice of inserting the socklining dry without any additional cement. This alone, will appreciably reduce cleaning costs.

The Baruway process can also provide significant savings in the field of cushion covered insoles employed in dress, work and open sandal types of shoe constructions. At the present time in the shoe making industry, the cushion covered insoles are tacked to the last. The manufacturer has to use extra large size tacks running from the common size #4 up to a #8 and, in many instances, the tacking is done by hand because of the size and thickness of the covered insole and the size of the tack. In addition to the normal problems encountered in tacking, the use of tacks creates undersirable tears through the cushion cover. The use of the Baruway process with the sheath acting as an intermediary to which the insole is temporarily adhesively attached eliminates the difficulties and extra costs of the tacking operation.

Although the above described savings will be offset to a certain extent by the cost of sheathing the lasts, we estimate the cost of practicing the Baruway process will be less than half of the cost of the equivalent operations as now practiced in the shoe making industry.

We claim:
1. A method of shoemaking comprising the steps of:
 (a) covering at least a portion of a last bottom with a sheath;
 (b) structurally forming a shoe around the sheathed last;
 (c) pulling the last from the sheath within the shoe; and thereafter,
 (d) finishing the shoe.

2. The method of claim 1 wherein said shoe is structurally formed by:
 (a) temporarily adhesively securing an insole to the sheath on the last bottom;
 (b) positioning an upper on the sheathed last;
 (c) lasting the shoe; and thereafter,
 (d) structurally completing the shoe.

3. The method of claim 1 wherein said shoe is structurally formed by:
 (a) positioning an upper on the sheathed last;
 (b) adhesively lasting the upper to the bottom and sides of the sheath; and thereafter,
 (c) structurally completing the shoe.

4. The method of claim 3 further characterized by using a full sheath to cover the last and by stitching and trimming the top line of the shoe and sheath after last pulling.

5. The method of claim 1 wherein said shoe is structurally formed by:
 (a) positioning an upper on the sheathed last;
 (b) adhesively lasting the upper to the sheath on the last bottom;
 (c) structurally completing the shoe.

6. The method of claim 5 further characterized by withdrawing the sheath from the shoe after last pulling.

7. The method of claim 5 further characterized by cutting out the sheath around the interior of the lasting margin after last pulling.

8. The method of claim 1 further characterized by withdrawing the sheath from the shoe after pulling the last.

9. The method of claim 8 further characterized by reusing said withdrawn sheath to cover the same or another last.

10. The method of claim 2 wherein said insole is temporarily adhesively secured to said sheath by a double-faced adhesive tape.

11. The method of claim 2 wherein said insole is temporarily adhesively secured to said sheath by means of an adhesive coating therebetween.

12. The method of claim 2 further characterized by withdrawing the sheath from the shoe after last pulling and inserting a socklining in the shoe.

13. The method of claim 1 wherein said shoe is structurally formed by:
  (a) temporarily adhesively securing a socklining to the sheath on the last bottom;
  (b) positioning an upper on the sheathed last;
  (c) adhesively lasting the upper to the socklining; and,
  (d) structurally completing the shoe;
said method being further characterized by withdrawing the sheath after last pulling.

14. The method of claim 1 wherein a moccasin shoe is structurally formed by:
  (a) temporarily adhesively securing a heel tuck to the sheath on the last bottom;
  (b) positioning a vamp on the sheathed last;
  (c) tacking the vamp to the last;
  (d) tacking a plug to the last;
  (e) hand sewing the plug and vamp;
  (f) lasting a heel seat; and,
  (g) cementing a midsole;
said method being further characterized after last pulling but before finishing by:
  (h) Littleway attaching a midsole;
  (i) inserting the last back in the shoe;
  (j) Goodyear stitching an outsole to the midsole;
  (k) completing the shoe;
  (l) pulling the last; and,
  (m) withdrawing the sheath from the shoe.

15. A method for controlling the back height of shoe uppers comprising the steps of:
  (a) covering at least the spine portion of a last having back height control marks with a material through which said marks will be visible when the spine portion is so covered;
  (b) attaching a double faced adhesive tape to said material over the bulge of the heel spine below a selected back height control mark;
  (c) positioning the back of a shoe upper to the proper height and alignment, and then,
  (d) pressing the upper into contact with said double faced adhesive tape.

16. The method of claim 15 further characterized by said material covering the spine of said last being a thermo-shrunk, thermoplastic.

References Cited

UNITED STATES PATENTS

| | | | |
|---|---|---|---|
| 2,072,838 | 3/1937 | Miller | 12—107 |
| 2,134,220 | 10/1938 | Vegessy | 36—72 X |
| 3,276,055 | 10/1966 | Batchelder et al. | 12—142 |
| 3,419,929 | 1/1969 | Snow et al. | 12—142 |

PATRICK D. LAWSON, Primary Examiner

U.S. Cl. X.R.

36—72